US007621370B2

(12) United States Patent
Abe et al.

(10) Patent No.: US 7,621,370 B2
(45) Date of Patent: Nov. 24, 2009

(54) SOUND INCREASE APPARATUS

(75) Inventors: Hiroyuki Abe, Kawasaki (JP); Hiromichi Akamatsu, Tokyo (JP); Akira Sasaki, Kanagawa (JP); Masashi Shinada, Saitama (JP); Yuta Saito, Tokyo (JP)

(73) Assignees: Nissan Motor Co., Ltd., Yokohama-shi (JP); Mahle Filter Systems Japan Corporation, Tokyo (JP)

( * ) Notice: Subject to any disclaimer, the term of this patent is extended or adjusted under 35 U.S.C. 154(b) by 321 days.

(21) Appl. No.: 11/454,887

(22) Filed: Jun. 19, 2006

(65) Prior Publication Data

US 2006/0283658 A1 Dec. 21, 2006

(30) Foreign Application Priority Data

Jun. 20, 2005 (JP) ............................. 2005-179682

(51) Int. Cl.
*F02B 77/13* (2006.01)
*B64D 33/02* (2006.01)
*F01N 7/10* (2006.01)
*F02M 35/10* (2006.01)

(52) U.S. Cl. ....................... 181/204; 181/214; 181/240; 123/184.57

(58) Field of Classification Search ................. 181/204, 181/214, 240; 123/184.53–184.59
See application file for complete search history.

(56) References Cited

U.S. PATENT DOCUMENTS

| | | | | |
|---|---|---|---|---|
| 5,214,282 | A | 5/1993 | Yamaguchi et al. | |
| 5,298,975 | A | 3/1994 | Khoury et al. | |
| 6,644,436 | B2 * | 11/2003 | Hofmann et al. | 181/214 |
| 6,932,189 | B2 * | 8/2005 | Helber et al. | 181/240 |
| 7,188,703 | B2 * | 3/2007 | Hofmann et al. | 181/271 |
| 7,353,791 | B2 * | 4/2008 | Sasaki et al. | 123/184.57 |
| 2002/0020173 | A1 * | 2/2002 | Varney | 60/737 |
| 2002/0157897 | A1 * | 10/2002 | Hofmann et al. | 181/214 |
| 2003/0057015 | A1 * | 3/2003 | Helber et al. | 181/240 |
| 2004/0118371 | A1 * | 6/2004 | Kino et al. | 123/184.42 |
| 2005/0121254 | A1 * | 6/2005 | Hofmann et al. | 181/237 |
| 2005/0121255 | A1 * | 6/2005 | Hofmann et al. | 181/250 |

FOREIGN PATENT DOCUMENTS

| | | |
|---|---|---|
| DE | 100 42 012 A1 | 5/2001 |
| DE | 102 23 872 A1 | 12/2003 |
| DE | 102 23 875 A1 | 12/2003 |
| EP | 1054249 | 11/2000 |
| JP | 4-102008 | 4/1992 |
| JP | 10-81951 | 3/1998 |
| JP | 2000-65716 | 3/2000 |
| JP | 2000-199737 | 7/2000 |
| JP | 2001-91441 | 4/2001 |
| JP | 2004-218458 | 8/2004 |

* cited by examiner

*Primary Examiner*—Jeffrey Donels
*Assistant Examiner*—Christina Russell
(74) *Attorney, Agent, or Firm*—Foley & Lardner LLP

(57) ABSTRACT

A sound increase apparatus includes a partition wall adapted to divide an engine room for defining a first engine room space that is located on a side of a dash panel and a second engine room space in which an engine is installed, and a first pressure fluctuation amplification unit inter-communicating an engine inlet pipe arranged in the second engine room space and the first engine room space. The first pressure fluctuation amplification unit amplifies a pressure fluctuation of a first frequency selected from a plurality of frequencies when pressure of air residing inside the engine inlet pipe fluctuates at the plurality of frequencies.

9 Claims, 4 Drawing Sheets

SOUND INCREASE APPARATUS

BACKGROUND OF THE INVENTION

The present invention relates to a sound increase apparatus which is capable of improving sound quality of an intake sound generated from an engine inlet pipe of automotive engine.

In recent years, there have been proposed and developed various sound increase apparatus which increase or strengthen an intake sound and convey it to a vehicle cabin. One such sound increase apparatus has been disclosed in Japanese Patent Provisional Publication No. 2004-218458 (hereinafter is referred to as "JP2004-218458"). In JP2004-218458, an air induction part is provided for intake of air, and is connected to one end of an air intake duct through an air cleaner. The other end of the air intake duct is connected to an engine. The air induction part is formed with an opening on a side wall thereof, and the opening and a dash panel are connected by flexible tubes. An intake sound resulting from air pulsation that propagates through the inside of the flexible tubes is conveyed into a vehicle cabin via the dash panel. And thus, a sporty intake sound can be rendered in the cabin.

SUMMARY OF THE INVENTION

In the above sound increase apparatus in JP2004-218458, however, the intake sound propagates through the inside of the long flexible tubes from the opening to the dash panel. The intake sound therefore tends to be attenuated before propagating to the dash panel due to the long flexible tubes. Because of this, a sound pressure level of the intake sound propagating into the cabin via the dash panel becomes low, and a powerful intake sound can not be rendered in the cabin. Accordingly, there is scope for improvement in the rendition of the powerful intake sound.

It is therefore an object of the present invention to provide a sound increase apparatus which is capable of rendering the powerful intake sound by increasing the sound pressure level of the intake sound propagating into the cabin and by widening a frequency band in which the intake sound can be strengthened.

According to one aspect of the present invention, a sound increase apparatus comprises a partition wall adapted to divide an engine room for defining a first engine room space that is located on a side of a dash panel and a second engine room space in which an engine is installed, a first pressure fluctuation amplification unit inter-communicating an engine inlet pipe arranged in the second engine room space and the first engine room space, and the first pressure fluctuation amplification unit amplifies a pressure fluctuation of a first frequency selected from a plurality of frequencies when pressure of air residing inside the engine inlet pipe fluctuates at the plurality of frequencies.

According to another aspect of the present invention, a sound increase apparatus comprises a partition wall adapted to divide an engine room for defining a first engine room space that is located on a side of a dash panel and a second engine room space in which an engine is installed, and first pressure fluctuation amplification means inter-communicating an engine inlet pipe arranged in the second engine room space and the first engine room space, for amplifying a pressure fluctuation of a first frequency selected from a plurality of frequencies when pressure of air residing inside the engine inlet pipe fluctuates at the plurality of frequencies.

The other objects and features of this invention will become understood from the following description with reference to the accompanying drawings.

DETAILED DESCRIPTION OF THE INVENTION

Figure 1:
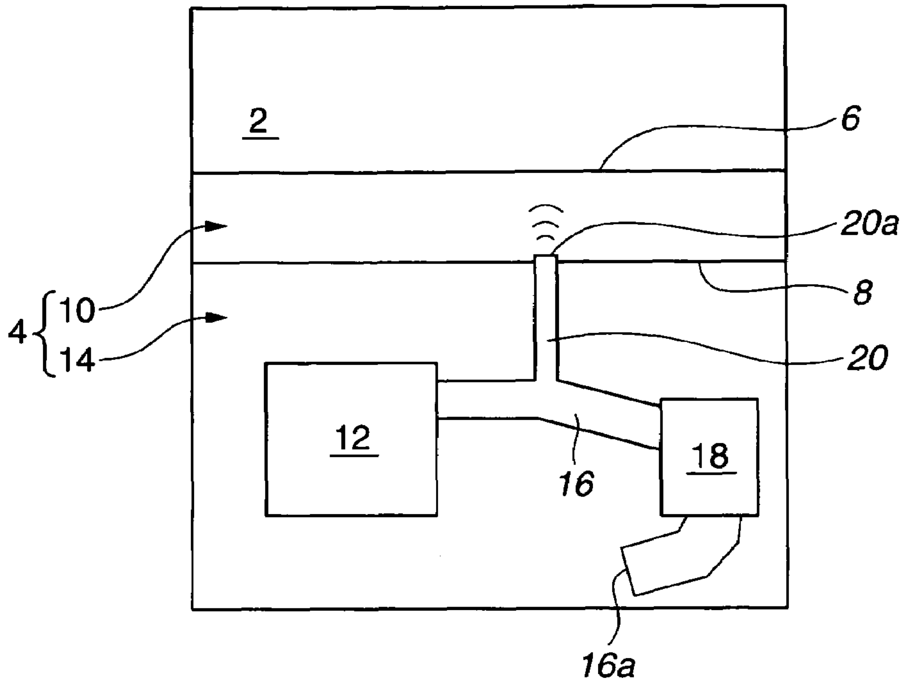
FIG. 1 is a schematic diagram showing a first embodiment according to the present invention.

Embodiments of the present invention will be explained below with reference to the drawings. FIG. 1 shows a schematic system diagram of a first embodiment. A cabin 2 and an engine room 4 are partitioned by a dash panel 6. In engine room 4, a division wall or a partition wall 8 is provided on the side of dash panel 6. Then, a first engine room (or a first engine room space) 10 and a second engine room (or a second engine room space) 14 are defined by partition wall 8. First engine room 10 is located on the side of dash panel 6. In second engine room 14, an engine 12 is installed. As can be seen in FIG. 1, an engine inlet pipe 16 is provided for intake of air, and its one end is connected to engine 12. The other end of engine inlet pipe 16 is an open end (an air intake or an air inlet) 16*a* which opens for taking in outside air. Further, an air cleaner 18 is attached to engine inlet pipe 16 on the side of air inlet 16*a*. In addition, air cleaner 18 has a filtering portion (such as an air filter) for filtering the outside air. And then, an incoming air from air inlet 16*a* becomes clean by passing the filtering portion.

The air in engine inlet pipe 16, which entered engine inlet pipe 16 from air inlet 16*a*, is taken into each cylinder (not shown) of engine 12 during an intake stroke of engine 12. In more detail, when taken into each of the cylinders, intake pulsations are generated in the air residing inside engine inlet pipe 16 with or in response to intake actions of engine 12, and therefore the intake pulsations become intake sound or inlet sound. Here, the intake pulsations are pressure fluctuations or pressure oscillations which generate in the air residing inside engine inlet pipe 16, and the pressure fluctuations have a plurality of fluctuation frequencies or a plurality of frequency component. That is, the intake pulsations generated with intake actions of engine 12 have a plurality of pulsation frequencies or a plurality of frequency component.

In this embodiment, a first pressure fluctuation amplification means or unit (or a first pressure fluctuation amplifier) 20 is fixedly connected to engine inlet pipe 16 between engine 12 and air cleaner 18, and communicates between engine inlet pipe 16 and first engine room 10 (an inside of the first engine room 10). This first pressure fluctuation amplification unit 20 is a cylindrical pipe (hereinafter called a first communicating pipe 20), and one open end portion of first communicating pipe 20 is fixedly connected to engine inlet pipe 16. While the other open end portion (called an open end 20*a*) of first communicating pipe 20 penetrates partition wall 8, and opens into first engine room 10. Further, an opening area and a length of first communicating pipe 20 are set or formed such that first communicating pipe 20 has a first resonance frequency which matches up with a first frequency selected in or from a plurality of frequencies of the intake pulsations that compose the intake pulsations generated inside engine inlet pipe 16.

When engine 12 works, the intake pulsations generated with intake actions of engine 12 propagate to or through the air residing inside engine inlet pipe 16. In these intake pulsations generated engine inlet pipe 16, an intake pulsation of the first frequency (an intake pulsation having the first frequency) propagates into first communicating pipe 20. At this time, since first communicating pipe 20 has the first resonance frequency matching up with the first frequency of this intake pulsation propagated into first communicating pipe 20, this intake pulsation having the first frequency is amplified. That is, a pressure fluctuation having the first frequency selected from the pressure fluctuations, which have a plurality of fluctuation frequencies and are generated in engine inlet pipe 16, is amplified or intensified by first pressure fluctuation amplification means 20. Or, when the pressure of the air residing inside engine inlet pipe 16 fluctuates at a plurality of frequencies, the pressure fluctuation of the first frequency selected in or from the plurality of frequencies is amplified by first pressure fluctuation amplification means 20. Therefore, the intake sound is strengthened or intensified, and is radiated from open end 20*a* of first communicating pipe 20, which opens into first engine room 10. Additionally, since first engine room 10 is partitioned by dash panel 6 and partition wall 8, sound can be easily conveyed toward dash panel 6. Thus, the strengthened intake sound is radiated from open end 20*a,* in other words, the strengthened intake sound generates in first engine room 10, and it is possible to render a sporty sound in the cabin.

Figure 2:
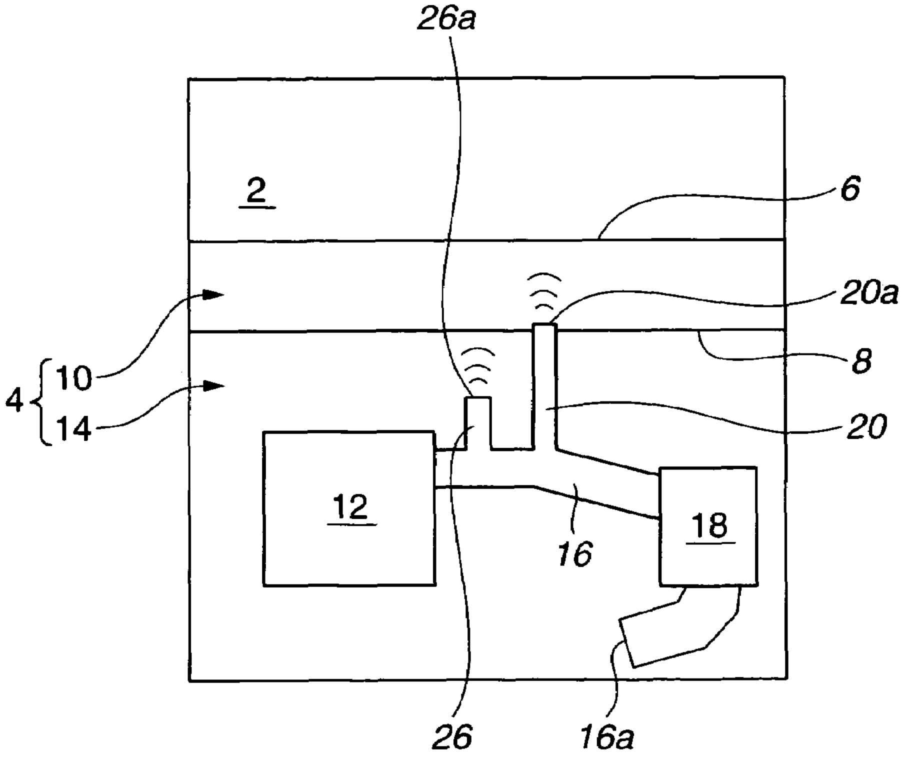
FIG. 2 is a schematic diagram showing a second embodiment.

Next, a configuration of a second embodiment will be explained with reference to FIG. 2. In FIG. 2, the same components as the first embodiment shown in FIG. 1 are denoted by the same reference numbers, and an explanation of these components is omitted. In the second embodiment, a second pressure fluctuation amplification means or unit (or a second pressure fluctuation amplifier) 26 is fixedly connected to engine inlet pipe 16 between engine 12 and first communicating pipe 20, and communicates between engine inlet pipe 16 and second engine room 14 (an inside of the second engine room 14). This second pressure fluctuation amplification unit 26 is a cylindrical pipe (hereinafter called a second communicating pipe 26), and one open end portion of second communicating pipe 26 is fixedly connected to engine inlet pipe 16. While the other open end portion (called an open end 26*a*) of second communicating pipe 26 opens in second engine room 14. An opening area and a length of second communicating pipe 26 are set or formed such that second communicating pipe 26 has a second resonance frequency which matches up with a second frequency selected from a plurality of frequencies of intake pulsations that compose the intake pulsations generated inside engine inlet pipe 16. Here, the second frequency is higher than the first frequency.

When engine 12 works, the intake pulsations generated with intake actions of engine 12 propagate to or through the air residing inside engine inlet pipe 16. In these intake pulsations generated engine inlet pipe 16, an intake pulsation of the first frequency (an intake pulsation having the first frequency) propagates into first communicating pipe 20, and an intake pulsation of the second frequency (an intake pulsation having the second frequency) propagates into second communicating pipe 26. At this time, since first communicating pipe 20 has the first resonance frequency matching up with the first frequency of the intake pulsation propagated into first communicating pipe 20, the intake pulsation having the first frequency is amplified. In other words, a pressure fluctuation of the first frequency selected in or from the plurality of frequencies is amplified by first communicating pipe 20 (first pressure fluctuation amplification unit 20). Therefore, the intake sound is strengthened or intensified, and is radiated from open end 20*a* of first communicating pipe 20, which opens into first engine room 10. Additionally, since second communicating pipe 26 has the second resonance frequency matching up with the second frequency of the intake pulsation propagated into second communicating pipe 26, the intake pulsation having the second frequency is amplified. In other words, a pressure fluctuation of the second frequency selected from the plurality of frequencies is amplified by second communicating pipe 26 (second pressure fluctuation amplification unit 26). And strengthened or intensified intake sound is radiated from open end 26*a* of second communicating pipe 26, which opens in second engine room 14.

The above intake sounds are respectively radiated from open ends 20*a* and 26*a,* and are conveyed to cabin 2. Here, parts or components associated with paths or routes where the respective intake sounds radiated from open end 20*a* of first communicating pipe 20 and from open end 26*a* of second communicating pipe 26 are conveyed to cabin 2 are different from each other. Because of this, even if phases of the intake sounds radiated from first and second communicating pipes 20 and 26 are opposite phases, these phases are respectively changed by the different routes or components while being conveyed to cabin 2. Therefore, a phase difference of these phases does not become 180 degrees (namely that these phases are not opposite phases) when the intake sounds are conveyed to cabin 2.

As explained in more detail below, the intake sound radiated from second communicating pipe 26 in second engine room 14 penetrates partition wall 8, first engine room 10 and dash panel 6, and is conveyed to cabin 2. For this reason, changes of a level or volume and the phase of the intake sound become large. On the other hand, the intake sound radiated from first communicating pipe 20 in first engine room 10 penetrates only dash panel 6, and therefore changes of a level or volume and the phase of the intake sound become small. As a result, the phase difference of the intake sounds conveyed from first and second communicating pipes 20, 26 to cabin 2 does not become 180 degrees (respective phases of the intake sounds from first and second communicating pipes 20, 26 are not opposite phases). Therefore, even if a frequency of the intake sound conveyed inside cabin 2 is in the frequency spectrum (or frequency band) between the first and second frequencies, each whose intake sound is amplified by first and second communicating pipes 20 and 26, a level of antiresonance becomes small. This can prevent a level or volume of the intake sound conveyed inside cabin 2 from decreasing.

In the above embodiments, first pressure fluctuation amplification unit 20 is configured so that the intake pulsation of the first frequency and the intake pulsation of the first resonance frequency match up with each other. Further, second pressure fluctuation amplification unit 26 is configured so that intake pulsation of the second frequency and the intake pulsation of the second resonance frequency match up with each other. However, first and second pressure fluctuation amplification units 20, 26 are not limited to this. That is, in order for the intake sound to be intensified, first pressure fluctuation amplification unit 20 can be set or formed such that first pressure fluctuation amplification unit 20 has the first resonance frequency substantially matching up with the first frequency. And also, second pressure fluctuation amplification unit 26 can be set or formed such that second pressure fluctuation amplification unit 26 has the second resonance frequency substantially matching up with the second frequency.

Figure 3:
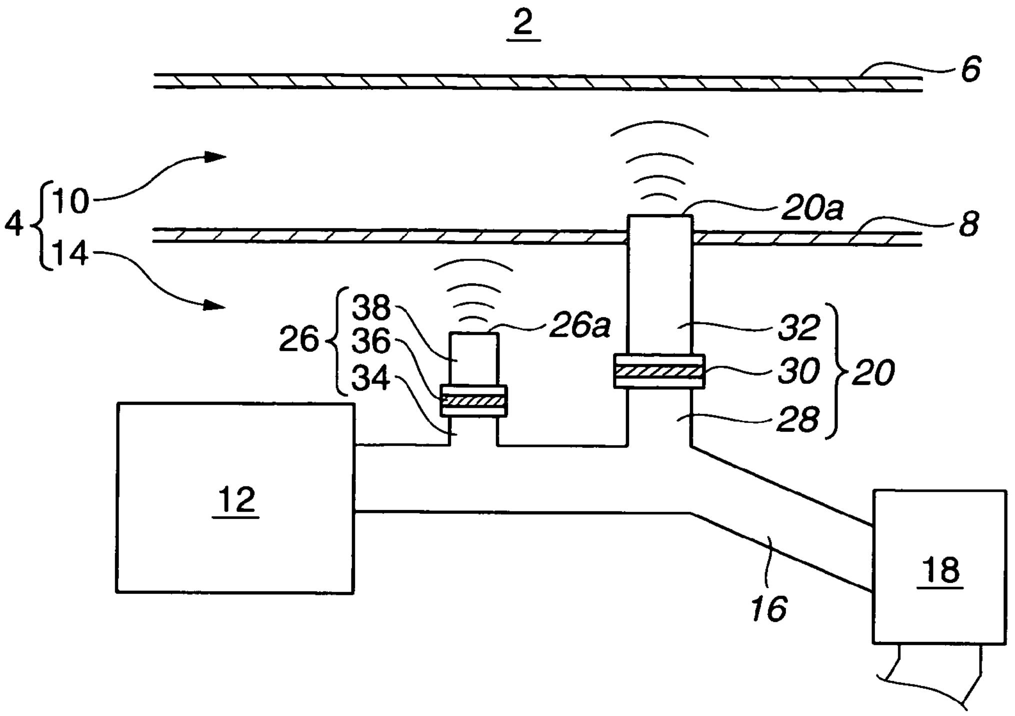
FIG. 3 is a schematic diagram showing a third embodiment.

Next, a configuration of a third embodiment will be explained with reference to FIG. 3. In the third embodiment as well, first and second pressure fluctuation amplification units 20 and 26 are provided in the same manner as the second embodiment. First pressure fluctuation amplification unit 20 has a first communicating pipe 28, a first diaphragm 30, and a first addition pipe 32, and then amplifies the intake pulsation having the first frequency selected from a plurality of frequencies of the intake pulsations, which compose the intake pulsations generated inside engine inlet pipe 16.

First communicating pipe 28 is a cylindrical pipe, and one open end portion thereof is fixedly connected to engine inlet pipe 16, then communicated with engine inlet pipe 16. First diaphragm 30 has a shape such that first diaphragm 30 is capable of closing the other open end portion of first communicating pipe 28 and one open end portion of first addition pipe 32, and then closes these the other open end portion of first communicating pipe 28 and one open end portion of first addition pipe 32. Further, first diaphragm 30 vibrates in an out-of-plane direction of first communicating pipe 28 by or in response to the intake pulsation (or pressure fluctuation) of the first frequency.

First addition pipe 32 is a cylindrical pipe, and is set to be longer than first communicating pipe 28. Further, first addition pipe 32 is connected to first communicating pipe 28 via first diaphragm 30 (or, with first diaphragm 30 sandwiched between first addition pipe 32 and first communicating pipe 28), then communicated with first communicating pipe 28. As described above, one open end portion of first addition pipe 32 is closed by first diaphragm 30. While the other open end portion (called an open end 20*a*) of first addition pipe 32 penetrates partition wall 8, and opens into first engine room 10. First diaphragm 30 and first addition pipe 32 are set or formed such that a first resonance frequency formed by first diaphragm 30 and first addition pipe 32 matches up with the first frequency.

Meanwhile, as for second pressure fluctuation amplification unit 26, second pressure fluctuation amplification unit 26 has a second communicating pipe 34, a second diaphragm 36, and a second addition pipe 38, and then amplifies the intake pulsation having the second frequency selected from a plurality of frequencies of the intake pulsations, which compose the intake pulsations generated inside engine inlet pipe 16.

Second communicating pipe 34 is a cylindrical pipe, and one open end portion thereof is fixedly connected to engine inlet pipe 16, then communicated with engine inlet pipe 16. Second diaphragm 36 has a shape such that second diaphragm 36 is capable of closing the other open end portion of second communicating pipe 34 and one open end portion of second addition pipe 38, and then closes these the other open end portion of second communicating pipe 34 and one open end portion of second addition pipe 38. Further, second diaphragm 36 vibrates in an out-of-plane direction of second communicating pipe 34 by or in response to the intake pulsation of the second frequency.

Second addition pipe 38 is a cylindrical pipe, and is set to be longer than second communicating pipe 34. Further, second addition pipe 38 is connected to second communicating pipe 34 via second diaphragm 36 (or, with second diaphragm 36 sandwiched between second addition pipe 38 and second communicating pipe 34), then communicated with second communicating pipe 34. As mentioned above, one open end portion of second addition pipe 38 is closed by second diaphragm 36. While the other open end portion (called an open end 26*a*) of second addition pipe 38 opens in second engine room 14. Second diaphragm 36 and second addition pipe 38 are set or formed such that a second resonance frequency formed by second diaphragm 36 and second addition pipe 38 matches up with the second frequency.

When engine 12 works, the intake pulsations generated with intake actions of engine 12 propagate to or through the air residing inside engine inlet pipe 16. The intake pulsation of the first frequency propagates to first diaphragm 30 through first communicating pipe 28. First diaphragm 30 vibrates in the out-of-plane direction of first communicating pipe 28 by the propagation of the intake pulsation of first frequency, and further, the intake pulsation of first frequency is propagated to first addition pipe 32 by the vibration of first diaphragm 30. At this time, since the intake pulsation of first frequency propagated to first addition pipe 32 matches up with the intake pulsation of the first resonance frequency formed by first diaphragm 30 and first addition pipe 32 (in more detail, since the first frequency of the intake pulsation propagated to first addition pipe 32 and the first resonance frequency formed by first diaphragm 30 and first addition pipe 32 match up with each other), the intake pulsation of first frequency is amplified. Therefore, the intake sound is strengthened or intensified, and is radiated from open end 20*a* of first addition pipe 32 to the inside of first engine room 10.

The intake pulsation of the second frequency propagates to second diaphragm 36 through second communicating pipe 34. Second diaphragm 36 vibrates in the out-of-plane direction of second communicating pipe 34 by the propagation of the intake pulsation of second frequency, and further, the intake pulsation of second frequency is propagated to second addition pipe 38 by the vibration of second diaphragm 36. At this time, since the intake pulsation of second frequency propagated to second addition pipe 38 matches up with the intake pulsation of the second resonance frequency formed by second diaphragm 36 and second addition pipe 38 (in more detail, since the second frequency of the intake pulsation propagated to second addition pipe 38 and the second resonance frequency formed by second diaphragm 36 and second addition pipe 38 match up with each other), the intake pulsation of second frequency is amplified. Therefore, the intake sound is strengthened or intensified, and is radiated from open end 26*a* of second addition pipe 38 to the inside of second engine room 14.

Accordingly, in the sound increase apparatus of the third embodiment, each of the intake sounds radiated from open end 20*a* of first addition pipe 32 and open end 26*a* of second addition pipe 38 is strengthened, and it is possible to render the sporty sound in the cabin.

In addition to this, in the same manner as the second embodiment, parts or components associated with respective routes where the respective intake sounds radiated from first addition pipe 32 and from second addition pipe 38 conveyed to cabin 2 are different from each other. Because of this, even if phases of the intake sounds radiated from first and second addition pipes 32 and 38 are opposite phases, these phases are respectively changed by the different routes or components while being conveyed to cabin 2. And therefore, a phase difference of these phases does not become 180 degrees (namely that these phases are not opposite phases) when the intake sounds are conveyed to cabin 2. It is therefore possible to prevent the level or volume of the intake sound conveyed inside cabin 2 from decreasing.

Further, in this embodiment, first communicating pipe 28 is set to be shorter than first addition pipe 32. Because of this, a resonance frequency of first communicating pipe 28 resides in a higher frequency band than the first resonance frequency. Likewise, second communicating pipe 34 is set to be shorter than second addition pipe 38. Therefore, a resonance frequency of second communicating pipe 34 resides in a higher frequency band than the second resonance frequency. Consequently, there is not a possibility that both first and second communicating pipes 28 and 34 may function as a side-branch in a frequency band in which the frequency of amplified intake pulsation resides. And also, the intake sound, which tends to be emitted to air through an inside of engine inlet pipe 16, is not decreased or reduced.

Furthermore, in the shown embodiment, first diaphragm 30 and first addition pipe 32 are set such that the first resonance frequency formed by first diaphragm 30 and first addition pipe 32 matches up with the first frequency. On the other hand, second diaphragm 36 and second addition pipe 38 are set such that the second resonance frequency formed by second diaphragm 36 and second addition pipe 38 matches up with the second frequency. However, these setting are not limited. That is, in order for the intake sound to be intensified, first diaphragm 30 and first addition pipe 32 can be configured so that the intake pulsation of first frequency and the intake pulsation of the first resonance frequency substantially match up with each other. On the other hand, second diaphragm 36 and second addition pipe 38 can be configured so that the intake pulsation of second frequency and the intake pulsation of the second resonance frequency substantially match up with each other. Moreover, it can be also possible that first communicating pipe 28 is set to have the first resonance frequency singly, and second communicating pipe 34 is set to have the second resonance frequency singly.

Figure 4:
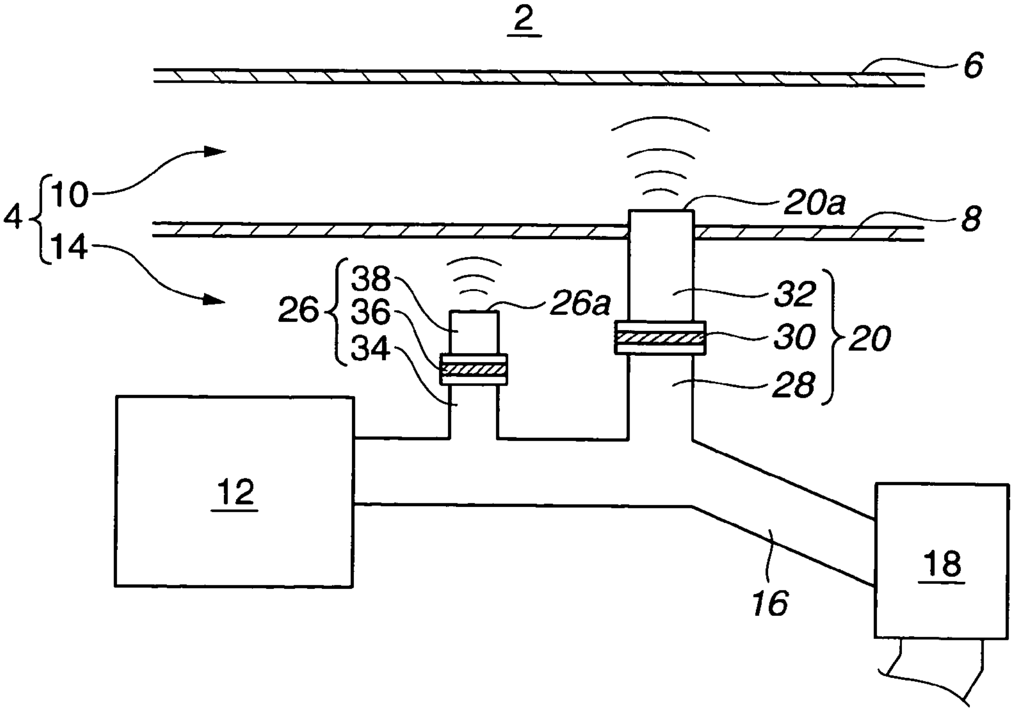
FIG. 4 is a schematic diagram showing a fourth embodiment.

Next, a configuration of a fourth embodiment will be explained with reference to FIG. 4. The fourth embodiment is structurally similar to that of the third embodiment, except for first communicating pipe 28 and second communicating pipe 34. In this embodiment, first communicating pipe 28 is longer as compared with that of the third embodiment. Second communicating pipe 34 is also longer as compared with that of the third embodiment.

By setting a length of first communicating pipe 28 to be longer, it becomes possible to set a resonance frequency by first communicating pipe 28 itself, besides the first resonance frequency formed by first diaphragm 30 and first addition pipe 32. And by setting a length of second communicating pipe 34 to be longer, it becomes possible to set a resonance frequency by second communicating pipe 34 itself, besides the second resonance frequency formed by second diaphragm 36 and second addition pipe 38. As a result, respective levels of the intake sounds radiated from open end 20*a* of first addition pipe 32 and from open end 26*a* of second addition pipe 38 can be increased. Accordingly, in the fourth embodiment, in addition to effects of the third embodiment, an effect of increase of the intake sound can be further enhanced.

Figure 5:
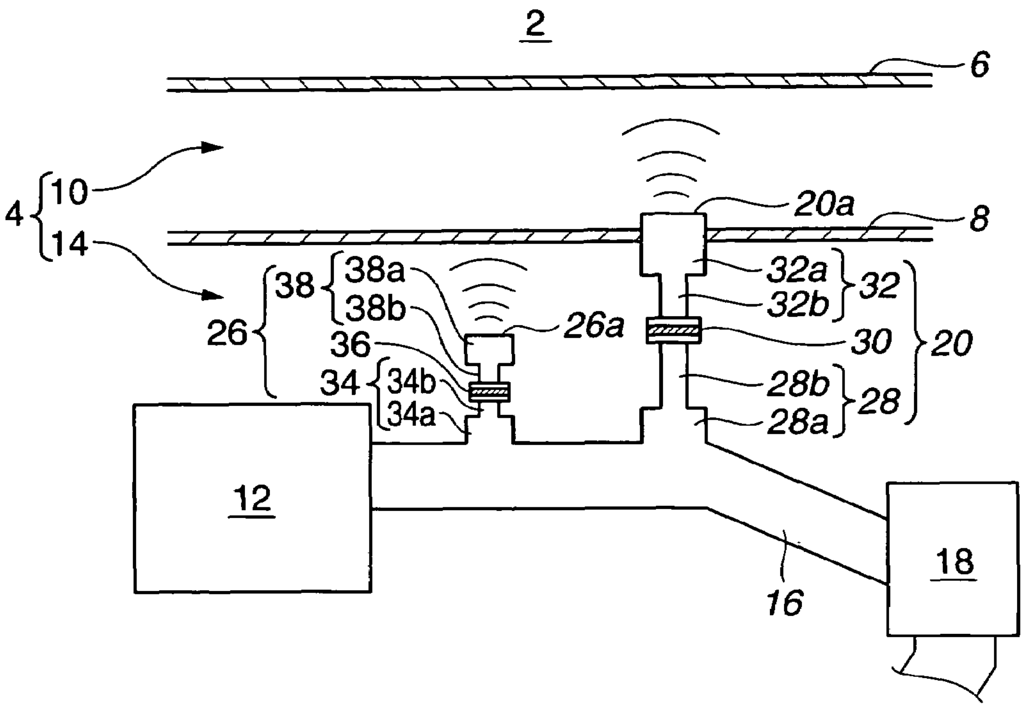
FIG. 5 is a schematic diagram showing a fifth embodiment.

Next, a configuration of a fifth embodiment will be explained with reference to FIG. 5. The fifth embodiment is structurally similar to that of the third embodiment, except for first communicating pipe 28, first addition pipe 32, second communicating pipe 34, and second addition pipe 38. As can be seen in FIG. 5, first communicating pipe 28 is formed from communicating pipes 28*a* and 28*b*, whose opening areas are different from each other. First addition pipe 32 is formed from pipes 32*a* and 32*b*, whose opening areas are different from each other. Likewise, second communicating pipe 34 is formed from communicating pipes 34*a* and 34*b*, whose opening areas are different from each other. Second addition pipe 38 is formed from pipes 38*a* and 38*b*, whose opening areas are different from each other.

In this embodiment, by forming first addition pipe 32 from pipes 32*a* and 31*b* having different opening areas from each other, it becomes possible to change the first resonance frequency formed by first diaphragm 30 and first addition pipe 32 without lengthening a length of first addition pipe 32. Further, by forming first communicating pipe 28 from communicating pipes 28*a* and 28*b* having different opening areas from each other, it becomes possible to set the resonance frequency by first communicating pipe 28 itself without lengthening a length of first communicating pipe 28.

Likewise, by forming second addition pipe 38 from pipes 38*a* and 38*b* having different opening areas from each other, it becomes possible to change the second resonance frequency formed by second diaphragm 36 and second addition pipe 38 without lengthening a length of second addition pipe 38. And, by forming second communicating pipe 34 from communicating pipes 34*a* and 34*b* having different opening areas from each other, it becomes possible to set the resonance frequency by second communicating pipe 34 itself without lengthening a length of second communicating pipe 34.

In these manners, these first and second communicating pipes 28, 34, and first and second addition pipes 32, 38 are respectively formed from a plurality of pipes having different opening areas from each other. Accordingly, as described above, it is possible to set the resonance frequency without lengthening the lengths of respective pipes 28, 34, 32 and 38, and thereby increasing flexibility in layout. And the other effects except the above are the same as the third embodiment. In this embodiment, the above pipes 28, 34, 32 and 38 are respectively formed from two pipes having different opening areas from each other. However, a number of the pipe is not limited to two. It can be two or more, in order to set a desired resonance frequency. Further, it may be possible that respective shapes of the pipes 28, 34, 32 and 38 are not uniform longitudinally but different. For instance, the pipes 28, 34, 32 and 38 may respectively have portions of different-sized opening areas or lengths rather than forming from the plurality of pipes having different opening areas or lengths from each other.

Figure 6:
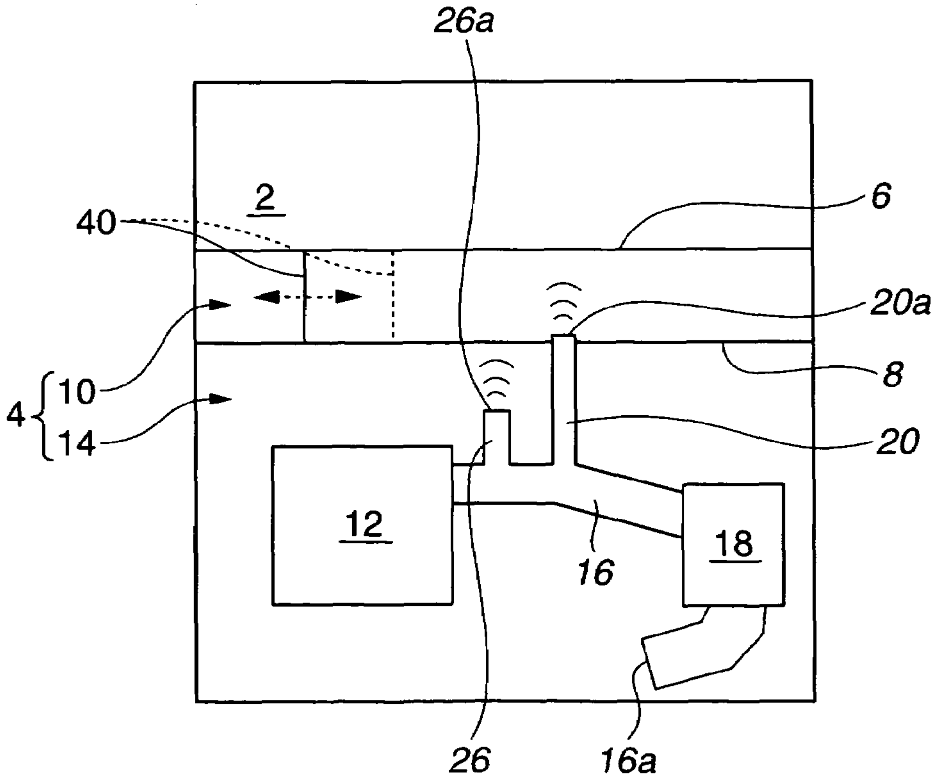
FIG. 6 is a schematic diagram showing a sixth embodiment.

Next, a configuration of a sixth embodiment will be explained with reference to FIG. 6. The sixth embodiment is structurally similar to that of the second embodiment, except for first engine room 10 defined by dash panel 6 and partition wall 8. More specifically, an additional partition wall 40 is provided inside first engine room 10, and disposed or set to be orthogonal to both dash panel 6 and partition wall 8 between dash panel 6 and partition wall 8. And then, additional partition wall 40 divides the inside of first engine room 10. Further, additional partition wall 40 can move or shift in a lateral direction (in a direction of the width of a car), and therefore a spatial volume or capacity of first engine room 10 can be varied.

When the intake sound is radiated from open end 20*a* of first pressure fluctuation amplification unit 20 to the inside of first engine room 10, there is a possibility that a resonance frequency which a space of first engine room 10 has and the first resonance frequency of first pressure fluctuation amplification unit 20 will match up with each other. When matching up with each other, any of the dash panel 6, partition wall 8, additional partition wall 40, and vehicle body members, which define first engine room 10, may resonate or vibrate. This causes generation of a droning or buzzing sound or the whine of first engine room 10, which might offend occupants or passengers in cabin 2. Thus, in order for the resonance frequency of the space of first engine room 10 not to match up with the first resonance frequency of first pressure fluctuation amplification unit 20, the spatial volume of first engine room 10 is adjusted by moving additional partition wall 40 in the lateral direction. And therefore, the above offending sound can be suppressed or avoided, and occupants in cabin 2 are not offended. The other effects except the above are the same as the second embodiment.

Figure 7:
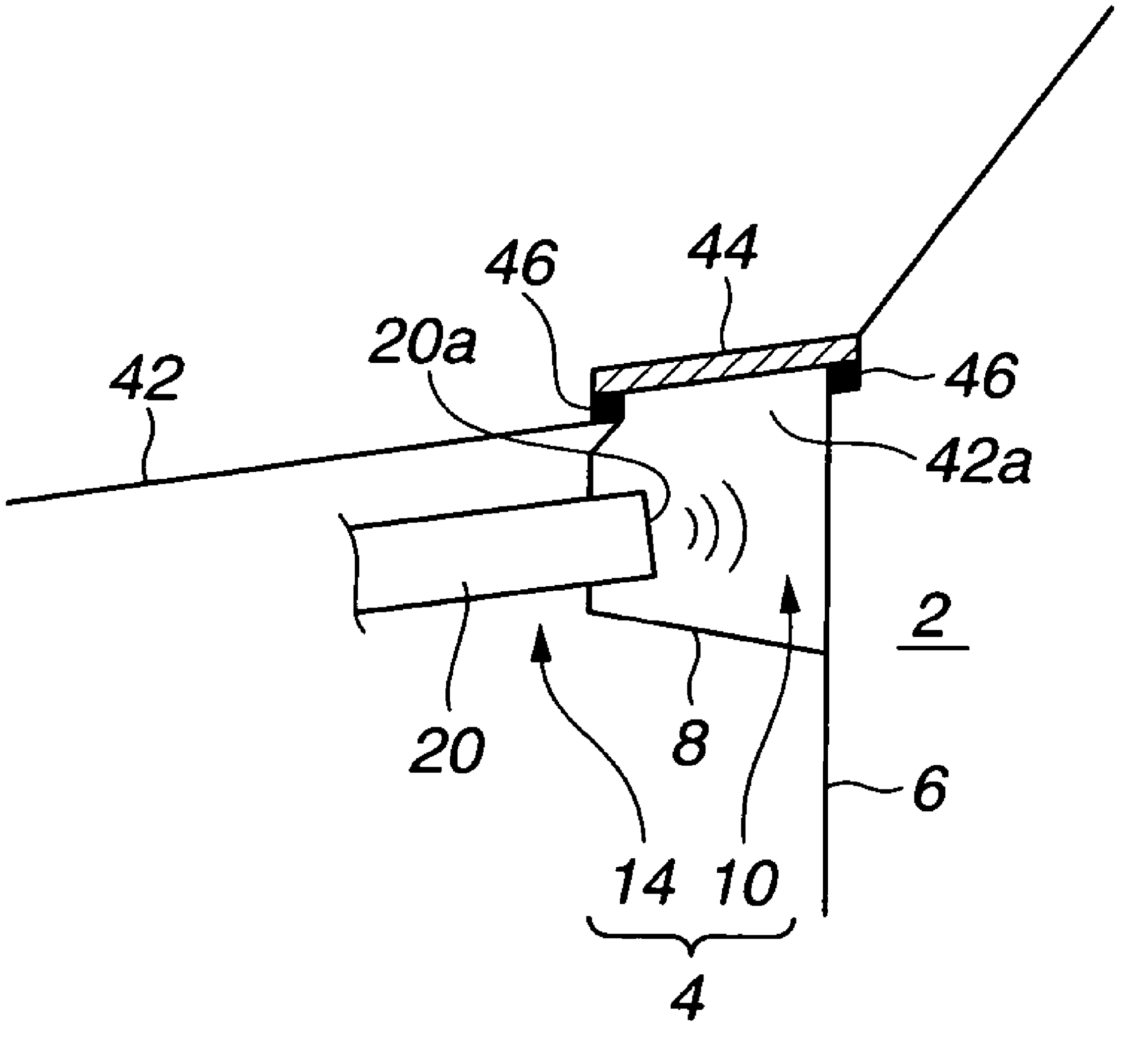
FIG. 7 is a schematic diagram showing a seventh embodiment.

Next, a configuration of a seventh embodiment will be explained with reference to FIG. 7. A vehicle body member 42, which defines engine room 4, has an opening portion 42*a* opening an upside or top of first engine room 10. Opening portion 42*a* is covered with an air box cover 44 that is available to lead or introduce air into first engine room 10. Additionally, air box cover 44 is fixed at an opening edge portion of the vehicle body member via an elastic damper member 46.

In this embodiment, when the amplified intake sound is radiated from open end 20*a* of first communicating pipe 20, there is a case that the resonance frequency of the space of first engine room 10 and a resonance frequency which air box cover 44 has match up with each other, and air box cover 44 attempts to vibrate or resonate. In that case, damper member 46 formed of elastic body suppresses or reduces the vibration of air box cover 44 (or transmitting of the vibration of air box cover 44). As a result of this, a droning or buzzing sound or the whine of air box cover 44 generated by the vibration of air box cover 44 can be prevented from entering cabin 2.

This application is based on a prior Japanese Patent Application No. 2005-179682 filed on Jun. 20, 2005. The entire contents of this Japanese Patent Application No. 2005-179682 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A sound increase apparatus comprising:

a partition wall adapted to divide an engine room into a first engine room space which is located on a side of a dash panel and in which no engine is installed and a second engine room space in which an engine is installed;

a first pressure fluctuation amplification unit, including one end which communicates with an engine inlet pipe arranged in the second engine room space and another end which opens in the first engine room space, wherein the first pressure fluctuation amplification unit is adapted to amplify a pressure fluctuation of a first frequency selected from a plurality of frequencies when pressure of air residing inside the engine inlet pipe fluctuates at the plurality of frequencies.

2. The sound increase apparatus as claimed in claim 1, further comprising:

a second pressure fluctuation amplification unit, including one end which communicates with the engine inlet pipe and another end which opens in the second engine room space, wherein the second pressure fluctuation amplification unit is adapted to amplify a pressure fluctuation of a second frequency selected from the plurality of frequencies.

3. The sound increase apparatus as claimed in claim 2, wherein:

he first pressure fluctuation amplification unit is a first communicating pipe that communicates with the engine inlet pipe and has a first resonance frequency substantially matching up with the first frequency, the second pressure fluctuation amplification unit is a second communicating pipe that communicates with the engine inlet pipe and has a second resonance frequency substantially matching up with the second frequency.

4. The sound increase apparatus as claimed in claim 2, wherein:

the first pressure fluctuation amplification unit comprises:

(a) a first communicating pipe which communicates with the engine inlet pipe;

(b) a first diaphragm which closes an open end of the first communicating pipe and vibrates in an out-of-plane direction of the first communicating pipe by the pressure fluctuation of the first frequency; and (c) a first addition pipe, one of whose open ends is closed by the first diaphragm, connected to the first communicating pipe with the first diaphragm sandwiched between the first addition pipe and the first communicating pipe, wherein the first diaphragm and the first addition pipe are set such that a first resonance frequency formed by the first diaphragm and the first addition pipe substantially matches up with the first frequency; and the second pressure fluctuation amplification unit comprises:

(d) a second communicating pipe which communicates with the engine inlet pipe;

(e) a second diaphragm which closes an open end of the second communicating pipe and vibrates in an out-of-plane direction of the second communicating pipe by the pressure fluctuation of the second frequency; and (f) a second addition pipe, one of whose open ends is closed by the second diaphragm, connected to the second communicating pipe with the second diaphragm sandwiched between the second addition pipe and the second communicating pipe, wherein the second diaphragm and the second addition pipe are set such that a second resonance frequency formed by the second diaphragm and the second addition pipe substantially matches up with the second frequency.

5. The sound increase apparatus as claimed in claim 4, wherein:

at least one of the first addition pipe and the second addition pipe is formed from a plurality of pipes that are different from each other in at least one of opening area and length.

6. The sound increase apparatus as claimed in claim 1, further comprising:

an additional partition wall dividing the first engine room space and varying a spatial volume of the first engine room space with which the first pressure fluctuation amplification unit is communicated.

7. The sound increase apparatus as claimed in claim 1, wherein:

a vehicle body member defining the first engine room space is provided with an opening portion on an upside of the first engine room space, and the opening portion is covered with an air box cover which introduces air into the first engine room space and is fixed at the vehicle body member through a damper member that reduces transmission of vibration.

8. The sound increase apparatus as claimed in claim 1, wherein:

the first pressure fluctuation amplification unit is a pipe, and branches off from the engine inlet pipe.

9. A sound increase apparatus comprising:

a partition wall adapted to divide an engine room into a first engine room space which is located on a side of a dash panel and in which no engine is installed and a second engine room space in which an engine is installed; and first pressure fluctuation amplification means, including one end which communicates with an engine inlet pipe arranged in the second engine room space and another end which opens in the first engine room space, for amplifying a pressure fluctuation of a first frequency selected from a plurality of frequencies when pressure of air residing inside the engine inlet pipe fluctuates at the plurality of frequencies.

* * * * *